(12) United States Patent
Yamanaka et al.

(10) Patent No.: US 7,471,617 B2
(45) Date of Patent: Dec. 30, 2008

(54) OPTICAL DISC MEDIUM HAVING EXTENDED RECORD CONTROL DATA AREAS, OPTICAL DISC APPARATUS USING THE SAME, AND DATA RECORDING METHOD ON THE SAME

(75) Inventors: Yutaka Yamanaka, Tokyo (JP); Shigeru Shimonou, Tokyo (JP); Tatsunori Ide, Tokyo (JP); Hideki Takahashi, Chiba (JP); Akihito Ogawa, Kanagawa (JP); Yutaka Kashihara, Kanagawa (JP)

(73) Assignees: NEC Corporation, Tokyo (JP); Kabushiki Kaisha Toshiba, Tokyo (JP)

( * ) Notice: Subject to any disclaimer, the term of this patent is extended or adjusted under 35 U.S.C. 154(b) by 530 days.

(21) Appl. No.: 11/111,767

(22) Filed: Apr. 22, 2005

(65) Prior Publication Data

US 2005/0237875 A1    Oct. 27, 2005

(30) Foreign Application Priority Data

Apr. 23, 2004    (JP)    .............................. 2004-129087

(51) Int. Cl.
    *G11B 7/00*    (2006.01)
(52) U.S. Cl. .................................................. 369/275.3
(58) Field of Classification Search ....................... None
    See application file for complete search history.

(56) References Cited

U.S. PATENT DOCUMENTS 5,701,281 A    12/1997    Sano
5,940,853 A    8/1999    Ooi et al.
5,978,336 A *   11/1999    Mine et al. ................ 369/47.14
6,330,392 B1 *  12/2001    Nakatani et al. ............... 386/52
6,333,904 B1    12/2001    Hashimoto
6,600,707 B2    7/2003    Tsukada (Continued)

FOREIGN PATENT DOCUMENTS

CN    1288232 A    3/2001

(Continued)

OTHER PUBLICATIONS

ECMA: Standardizing Information and Communication Systems: "80 mm (1,46 Gbytes per side) and 120 mm (4,70 Gbytes per side) DVD Re-recordable Disk (DVD-RW)", Online, Dec. 2002, retrieved from the Internet: URL: http://www.ecma-international.org/publications/standards/Ecma-338.ht.

(Continued)

*Primary Examiner*—Joseph H Feild
*Assistant Examiner*—Peter Vincent Agustin
(74) *Attorney, Agent, or Firm*—Sughrue Mion, PLLC

(57) ABSTRACT

An optical disc medium includes a system area and a data area following the system area. A plurality of sets of an extended record control data area, a bordered area, and a border are possibly set in the data area continuously from the system area, and a first set of the plurality of sets does not include the extended record control data area. A user data is recorded in each of the bordered areas. In each of the plurality of sets other than the first set, a record control data associated with the user data which is recorded in the bordered area of the set is recorded in the extended record control data area.

1 Claim, 4 Drawing Sheets

U.S. PATENT DOCUMENTS

| | | |
|---|---|---|
| 6,621,783 B1 | 9/2003 | Murata |
| 6,628,584 B1 * | 9/2003 | Heemskerk et al. ........ 369/47.1 |
| 6,628,602 B2 | 9/2003 | Ohno et al. |
| 6,636,461 B2 | 10/2003 | Tsukada et al. |
| 6,728,186 B2 | 4/2004 | Weijenbergh et al. |
| 6,876,612 B2 | 4/2005 | Yoneyama et al. |
| 6,904,008 B2 * | 6/2005 | Kawashima et al. ..... 369/47.15 |
| 7,050,701 B1 | 5/2006 | Sasaki et al. |
| 7,085,221 B2 | 8/2006 | Lee et al. |
| 7,196,992 B2 * | 3/2007 | Kim .......................... 369/53.2 |
| 7,206,270 B2 | 4/2007 | Kuroda |
| 7,313,066 B2 | 12/2007 | Hwang et al. |
| 2002/0024923 A1 | 2/2002 | Ohno et al. |
| 2002/0136134 A1 | 9/2002 | Ito et al. |
| 2003/0067859 A1* | 4/2003 | Weijenbergh et al. .... 369/59.25 |
| 2003/0214890 A1 | 11/2003 | Lee et al. |
| 2005/0083767 A1 | 4/2005 | Terada et al. |
| 2005/0141351 A1 | 6/2005 | Yamanaka |
| 2005/0141377 A1 | 6/2005 | Yamanaka |
| 2006/0176787 A1 | 8/2006 | Blum |

FOREIGN PATENT DOCUMENTS

| | | |
|---|---|---|
| EP | 0 350 920 A2 | 1/1990 |
| EP | 0 798 711 A2 | 10/1997 |
| EP | 0 817 195 A2 | 1/1998 |
| EP | 1 083 748 A2 | 3/2001 |
| EP | 1 291 871 A2 | 3/2003 |
| JP | 63146287 | 6/1988 |
| JP | 2-280243 A | 11/1990 |
| JP | H06-338139 A | 12/1994 |
| JP | 10255266 | 9/1998 |
| JP | 2000-48370 A | 2/2000 |
| JP | 2000-504462 A | 4/2000 |
| JP | 2000-504463 A | 4/2000 |
| JP | 2000113458 | 4/2000 |
| JP | 2001-110055 A | 4/2001 |
| JP | 2001-202621 A | 7/2001 |
| JP | 2001-291245 A1 | 10/2001 |
| JP | 2001-312879 A | 11/2001 |
| JP | 2002-208139 A | 7/2002 |
| JP | 2002-312940 A | 10/2002 |
| JP | 2003173528 | 6/2003 |
| JP | 2003-228853 A | 8/2003 |
| JP | 2003-249020 A | 9/2003 |
| JP | 2003-331430 A | 11/2003 |
| JP | 2004-039186 A | 2/2004 |
| JP | 2005-310321 A | 11/2005 |
| WO | WO 03/075265 A2 | 9/2003 |
| WO | WO 03/107333 A1 | 12/2003 |

OTHER PUBLICATIONS

Pioneer: "DVD-Recording—Technical Information", www.poineeraus.com.au, 2002.

ECMA: Standardizing Information and Communication Systems: "Standard ECMA-267, 3rd Edition: 120 mm DVD—Read-Only Disk", Standard ECMA-267, No. 272, Apr. 2001, pp. 1-86.

U.S. Appl. No. 11/633,710, filed by Yutaka Yamanaka on Dec. 5, 2006.

U.S. Appl. No. 11/113,983, filed by Yutaka Yamanaka on Apr. 26, 2005.

U.S. Appl. No. 11/111,758, filed by Yutaka Yamanaka, et al. on Apr. 22, 2005.

U.S. Appl. No. 11/165,199, filed by Mitsuya Okada, et al. on Jun. 24, 2005.

U.S. Appl. No. 11,136,863, filed by Naota Yamamoto, et al. on May 5, 2005.

Information Technology—Multi-Media Commands—4 (MMC-4). Jan. 14, 2004.

80 nm (1.23 Gbytes per side) and 120 nm (3.95 Gbytes per side)—recordable disc. Feb. 13, 2001.

* cited by examiner

OPTICAL DISC MEDIUM HAVING EXTENDED RECORD CONTROL DATA AREAS, OPTICAL DISC APPARATUS USING THE SAME, AND DATA RECORDING METHOD ON THE SAME

CROSS REFERENCE TO RELATED APPLICATIONS

This patent application relates to U.S. patent application Ser. No. 11/113,983, which is pending, the contents of which are hereby incorporated by reference. Here, U.S. patent application Ser. No. 11/113,983 entitled "OPTICAL DISC MEDIUM, OPTICAL DISC APPARATUS USING THE SAME, AND DATA RECORDING METHOD ON THE SAME", and claiming a priority based on Japanese patent application No. 2004-131850, filed on Apr. 27, 2004 by Yutaka YAMANAKA.

Also, this patent application relates to U.S. patent application Ser. No. 11/111,758, which is pending, the contents of which are hereby incorporated by reference. Here, U.S. patent application Ser. No. 11/111,758 entitled "OPTICAL DISC MEDIUM, OPTICAL DISC APPARATUS USING THE SAME, AND DATA RECORDING METHOD IN THE SAME ", and claiming a priority based on Japanese patent application No. 2004-129085, filed on Apr. 23, 2004 by Yutaka YAMANAKA, Shigeru SHIMONOU, Tatsunori IDE, Hideki TAKAHASHI, Akihito OGAWA and Yutaka KASHIHARA.

Also, this patent application relates to U.S. patent application Ser. No. 11/165,199, which is pending, the contents of which are hereby incorporated by reference. Here, U.S. patent application Ser. No. 11/165,199 entitled "METHOD FOR RECORDING AND REPRODUCING DATA AND APPARATUS FOR THE SAME", and claiming a priority based on Japanese patent application No. 2004-187284, filed on Jun. 25, 2004 by Mitsuya OKADA and Yutaka YAMANAKA.

Also, this patent application relates to U.S. patent application Ser. No. 11/136,863, which is pending, the contents of which are hereby incorporated by reference. Here, U.S. patent application Ser. No. 11/136,863 entitled "OPTICAL DISC RECORDING SYSTEM", and claiming a priority based on Japanese patent application No. 2004-154422, filed on May 25, 2004, and Japanese patent application No. 2004-183350, filed on Jun. 22, 2004, by Naoto YAMAMOTO, Shigeru SHIMONOU and Masatsugu OGAWA.

Also, this patent application relates to U.S. patent application Ser. No. 10/962,712, which is pending, the contents of which are hereby incorporated by reference. Here. U.S. patent application Ser. No. 10/962,712 entitled "RECORDING TYPE OPTICAL DISK APPARATUS AND OPTICAL DISK MEDIUM", and claiming a priority based on Japanese patent application No. 353385/2003, filed on Oct. 14, 2003 by Yutaka Yamanaka.

Also, this patent application relates to U.S. patent application Ser. No. 11/019,926, which is pending, the contents of which are hereby incorporated by reference. Here U.S. patent application Ser. No. 11/019,926 entitled "OPTICAL DISC MEDIUM, AND APPARATUS AND METHOD FOR RECORDING DATA ON THE SAME", and claiming a priority based on Japanese patent application No. 433475/2003, filed on Dec. 26, 2003 and Japanese patent application No. 111513/2004, filed on Apr. 5, 2004 by Yutaka YAMANAKA.

Also, this patent application relates to U.S. patent application Ser. No. 11/633,710, which is pending, the contents of which are hereby incorporated by reference. Here, U.S. patent application Ser. No. 11/633,710 entitled "RECORDING TYPE OPTICAL DISC APPARATUS AND OPTICAL DISC MEDIUM", and claiming a priority based on Japanese patent application No. 2005-354764, filed on Dec. 8, 2005 by Yutaka Yamanaka.

BACKGROUND OF THE INVENTION

1. Field of the Invention

The present invention relates to a technique for recording a user data on an optical disc medium, and more particularly to an optical disc medium, and an optical disc apparatus using the same, and a recording method on the same.

2. Description of the Related Art

In an optical disc field in which a data is recorded and reproduced by using a small optical beam, a ROM (Read Only Memory) medium dedicated to reproduction is first spread widely in which an embossed data pit string is formed in advance, and then CD-R (Compact Disc-Recordable) and DVD-R (Digital Versatile Disc-Recordable) that a user data can be recorded are widely spread. Also, optical disc media called CD-RW (CD-ReWritable) and DVD-RW (DVD-Re-Writable) that data can be rewritten are known. Here, the optical disc media that the user data can be recorded are generically referred to as a recording type optical disc medium.

In the recording type optical disc medium, a spiral groove track is formed on an optical disc substrate, and a multi-layer recording layer made of an organic material and the like is formed thereon. A laser beam of high power is focused on this recording layer to change the property of the recording layer and to form a record pit. Thus, a data is recorded on the optical disc medium. The optical disc medium after the recording operation has a same data format as the ROM medium, and a servo signal of the substantially same property as the ROM medium can be obtained form the optical disc medium on which the data recorded. Thus, the optical disc apparatus dedicated to the reproduction can carry out the reproduction of the recorded user data on the optical disc medium.

Also, in the DVD-R, a user data is subjected to a format conversion into a format in which a data ID such as an address, and an error correction code are added, and then is recorded as a series of continuous data on the optical disc medium. This continuous record format is the same format as that of the DVD-ROM.

However, if the optical disc medium is given the perfectly same format as the DVD-ROM, the user data can be recorded only once. Therefore, a recording method called a multi-session and multi-border is adopted to permit the user data to be recorded additionally several times. In this case, a special data called a border area where data of a data position and the like is recorded is provided after the user data, and another user data is further recorded thereafter. A reproducing apparatus can reproduce the user data by using the data position data.

In conjunction with the above description, the following techniques for writing a data into a rewritable in recording medium such as CD-RW or DVD-RAM.

Japanese Laid Open Patent Application (JP-A 2000-504462) discloses a writing apparatus which includes a writing unit and a positioning unit. The writing unit writes a mark indicating a data block in an area of a recording medium with an electromagnetic emission beam, in order to write the data block on a track pattern of the rewritable recording medium. The positioning unit positions the writing unit in accordance with a track structure of the recording medium. The track structure has the track pattern. Such a writing apparatus has a first detecting unit, a second detecting unit and an initializing unit. The first detecting unit detects the area of the recording medium used to write the data block. The second detecting unit detects a non-written boundary area adjacent to the used area. The initializing unit writes a dummy data to the non-written boundary area.

Also, Japanese Laid Open Patent Application (JP-A 2000-504463) discloses a writing apparatus, which writes a data block to a track pattern on a writable recording medium. This writing apparatus includes a writing unit and a positioning unit. The writing unit writes a mark indicating a data block into the region of the recording medium with an electromagnetic emission beam. The positioning unit positions the writing unit on the recording medium in accordance with a track structure indicating a track pattern. This writing apparatus includes a state unit for generating a state data to indicate the fact that a write operation is carried out on at least one region of the recording medium. In the writing apparatus, the state data is extended from a start section of the track pattern region in which the data block is written, and has an initial region data for indicating an initial region to which it is written without any interruption.

SUMMARY OF THE INVENTION

An object of the present invention is to provide an optical disc medium in which a recordable capacity can be increased so as to be recognized from a user side, an optical disc apparatus using the same, and an optical disc data recording method in the optical disc apparatus.

Another object of the present invention is to provide an optical disc medium in which a number of times of an additional recording operation can be increased, an optical disc apparatus using the same, and an optical disc data recording method in the optical disc apparatus.

Still another object of the present invention is to provide an optical disc medium in which an access time can be shortened when a user data recorded is reproduced, an optical disc apparatus using the same, and an optical disc data recording method.

In an aspect of the present invention, an optical disc medium includes a system area and a data area following the system area. A plurality of sets of an extended record control data area, a bordered area, and a border are possibly set in the data area continuously from the system area, and a first set of the plurality of sets does not include the extended record control data area. A user data is recorded in each of the bordered areas. In each of the plurality of sets other than the first set, a record control data associated with the user data which is recorded in the bordered area of the set is recorded in the extended record control data area.

Here, the record control data associated with the user data which may be recorded in the boarded area of the first set is recorded in the system area, and a control data associated with the extended record control data area of each of the plurality of sets other than the first set may be recorded in the system area.

Also, in each of the plurality of sets other than the first set, the extended record control data area, the bordered area, and the border area may be established in this order.

Also, the control data may include a start address and end address of the extended record control data area. In this case, the control data may further include the record control data which is recorded in the extended record control data area of the set corresponding to the control data.

Also, when each of the plurality of sets is to be closed, the border area is established for the set. In this case, when each of the plurality of sets other than the first set is to be closed, a dummy data is recorded in a non-recorded portion of the extended record control data area for the set.

Also, the system area may include a test record area, a record control data area and a user data lead-in area. A trial recording operation is carried out to the test record area to determine an optimal record condition when the user data is recorded in the data area. The control data associated with the extended record control data area of each of the plurality of sets other than the first set is recorded in the record control data area. A data is recorded in the user data lead-in area to indicate a start position of the data area.

Also, the record control data area may include a basic data area in which the record control data associated with the user data for the first set is recorded; and an extended record control data area indication area in which the control data associated with the extended record control data area of each of the plurality of sets other than the first set is recorded. In this case, when the optical disc medium is closed, a dummy data is recorded in a non-recorded portion of extended record control data area indication area.

In another aspect of the present invention, a data recording method in an optical disc medium, may be achieved by providing the optical disc medium which comprises a system area and a data area following the system area; by recording a user data for a first set in a bordered area of the first set as a first portion of the data area; by recording a record control data associated with the recorded user data of the first set in the system area; by establishing a border for the first set in a border area of the first set after the bordered area of the first set, when the first set should be closed; and by reserving an extended record control data area for a second set after the border area of the first set.

The data recording method may be achieved by further recording a control data associated with the extended record control data area for the second set in the system area; recording a user data for the second set in a bordered area of the second set; and recording a record control data associated with the recorded user data for the second set in the extended record control data area for the second set.

Also, the data recording method may be achieved by further establishing a border area of the second set after the bordered area for the second set, when the second set should be closed; and reserving an extended record control data area for a third set after the border are for the second set. In this case, the data recording method may be achieved by further recording a dummy data in a non-recorded portion of the extended record control data area for the second set, when the second set should be closed.

Also, the data recording method may be achieved by further establishing a border area of a last set after a bordered area for the last set, when the last set should be closed; reserving an extended record control data area for a next set to the last set after the border area for the last set; establishing a lead-out area after the border area for the last set, when the optical disc medium should be closed; and recording a dummy data in a non-recorded portion of the system area.

In this case, the system area may include a test record area to which a trial recording operation is carried out to determine an optimal record condition when the user data is recorded in the data area; a record control data area in which the control data associated with the extended record control data area of each of the plurality of sets other than the first set is recorded; and a user data lead-in area in which a data is recorded to indicate a start position of the data area. The recording a record control data for each of the plurality of sets other than the first set may be achieved by recording the control data in the record control data area.

Also, the recording a dummy data in a non-recorded portion of the system area may be achieved by further recording the dummy data in a non-recorded portion of the record control data area.

In another aspect of the present invention, an optical disc apparatus includes a rotation drive system, an access unit, and a control section. The rotation drive system rotates an optical disc medium which is provided with a system area and a data area following the system area. The system area includes a test record area to which a trial recording operation is carried out to determine an optimal record condition when the user data is recorded in the data area, and a record control data area in which the control data associated with the extended record control data area of each of the plurality of sets other than the first set is recorded, and a user data lead-in area. The control section controls the rotation drive system to rotate the optical disc medium; and encodes a record data and controls the access unit to irradiate a laser beam such that the encoded data is recorded on the optical disc medium. The control section controls the access unit such that a user data for a first set is recorded in a bordered area of the first set as a first portion of the data area, and a record control data associated with the recorded user data of the first set is recorded in the basic data area of the system area.

Here, the control section may control the access unit such that a border for the first set is established in a border area of the first set after the bordered area of the first set, and an extended record control data area for a second set after the border area of the first set, when the first set should be closed.

Also, the control section may control the access unit such that a control data associated with the extended record control data area for a current set is recorded in the record control data area of the system area; a user data for the current set is recorded in a bordered area of the current set after the extended record control data area for the current set, and a record control data associated with the recorded user data of the current set is recorded in the extended record control data area for the current set.

Also, the control section may control the access unit such that a border of the current set is established after the bordered area for the current set, and an extended record control data area for a next set after the border are for the current set, when the current set should be closed, and such that a lead-out area after the border area for the last set, when the optical disc medium should be closed.

Also, the control section may control the access unit such that a dummy data is encoded and the encoded dummy data is recorded in a non-recorded portion of the extended record control data area for the current set, when the current set should be closed. In this case, the control section may control the access unit such that a dummy data is encoded and the encoded dummy data is recorded in a non-recorded portion of the record control data area of the system area.

DESCRIPTION OF THE PREFERRED EMBODIMENTS

Hereinafter, a data recording system for an optical disc apparatus using an optical disc medium of the present invention will be described in detail with reference to the attached drawings.

Figure 1:
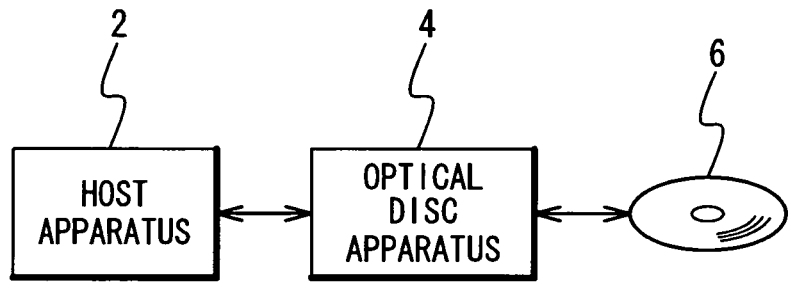
FIG. 1 is a block diagram showing a configuration of an optical disc system of the present invention.

FIG. 1 is a block diagram showing the configuration of the data recording system of the present invention. The data recording system is provided with a host apparatus 2 and an optical disc apparatus 4. The optical disc apparatus 4 is set with an optical disc medium 6 such as a DVD disc, and records a data on the optical disc medium 6 or reproduces the data from the optical disc medium, in accordance with a command from the host apparatus 2. Also, the optical disc apparatus 4 carries out a training process for checking and adjusting a record condition in response to a command from the host apparatus 2 prior to starting the write operation.

Figure 2:
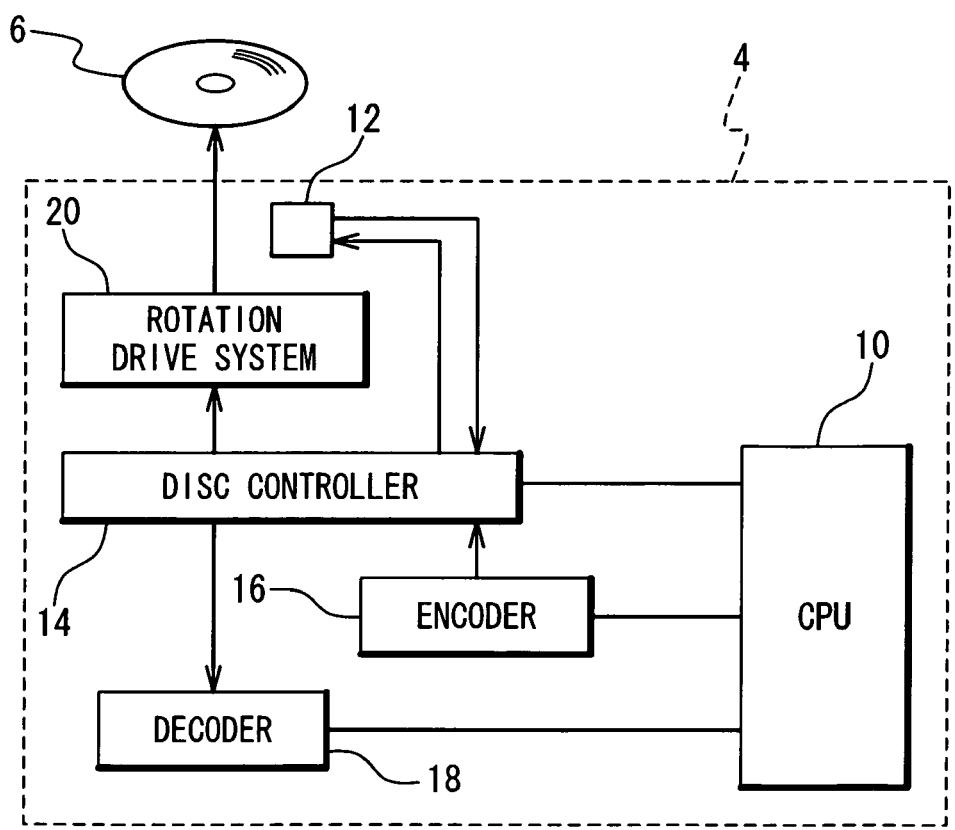
FIG. 2 is a block diagram showing a configuration of an optical disc apparatus of the present invention.

FIG. 2 is a block diagram showing the configuration of the optical disc apparatus 4 according to the first embodiment of the present invention. The optical disc apparatus 4 of the first embodiment is provided with a CPU 10, an access section 12, a disc controller 14, an encoder 16, a decoder 18 and a rotation driving system 20.

The CPU 10 controls the entire operation of the optical disc apparatus 4. The CPU 10 exchanges commands, notices and data with the host apparatus 2, and controls the disc controller 14, the encoder 16 and the decoder 18, and also carries out a necessary calculation. In addition, the CPU 10 output a dummy data of a predetermined bit pattern to the encoder 16.

The access section 12 contains a laser diode, uses a laser beam to write a data onto the optical disc medium 6 and reproduces the data from the optical disc medium 6. The access section 12 is well known to a skilled person in the art. The rotation driving system 20 drives the optical disc medium 6 in response to a command from the CPU 10 so that the optical disc medium 6 is rotated, when the optical disc medium 6 is set.

The disc controller 14 controls the access section 12 and the rotation driving system 20 such that the optical disc medium 6 is rotated, a laser control is carried out and the recording and reproducing operations are carried out. The disc controller 14 drives the rotation driving system 20 to rotate the optical disc medium 6 in accordance with a command from the CPU 10. Also, the disc controller 14 controls the position of the access section 12 in accordance with a command from the CPU 10, and also controls the operation of the access section 12 in the recording and reproducing operations. In the recording operation, the disc controller 14 controls the access section 12 to read a data necessary to carry out the recording operation from the optical disc medium 6, and to record the data sent from the encoder 16 onto the optical disc medium 6 based on the read-out necessary data. At this time, the access section 12 outputs the laser beam to record the data onto the optical disc medium 6. Also, in the reproducing operation, the disc controller 14 controls the access section 12 to reproduce the data from the optical disc medium 6. The access section 12 outputs the laser beam to reproduce the data from the optical disc medium 6. The reproduced data is sent through the disc controller 14 to the decoder 18.

The encoder 16 carries out an encoding process on a user data and the dummy data in response to a command from the CPU 10. For example, in case of the DVD, the encoder generates a record data in units of ECC (error correction code) blocks, each of which includes 16 sectors. The generated record data is sent to the access section 12 through the disc controller 14. A configuration in which the ECC block is extended to 32 sectors is proposed in a next generation DVD.

The decoder 18 carries out a decoding process of the data reproduced from the optical disc medium 6 in units of the ECC blocks in response to a command from the CPU 10.

In a recording type optical disc medium 6 such as DVD-R and DVD-RW, a spiral groove track for tracking is formed on an optical disc substrate. A multi-layer recording layer made of an organic material and the like is formed thereon. The laser beam of high power is focused on this recording layer to partially change the recording layer and to form record pits. Thus, the data is recorded on the optical disc medium 6. The optical disc medium 6 after the recording operation has the same data format as that of the embossed optical disc ROM medium (DVD-ROM or the like). Also, since a servo signal having the substantially same characteristics as the optical disc ROM medium can be obtained, the recorded data can be reproduced from the optical disc medium 6 by an optical apparatus dedicated to the reproduction.

Figure 3:
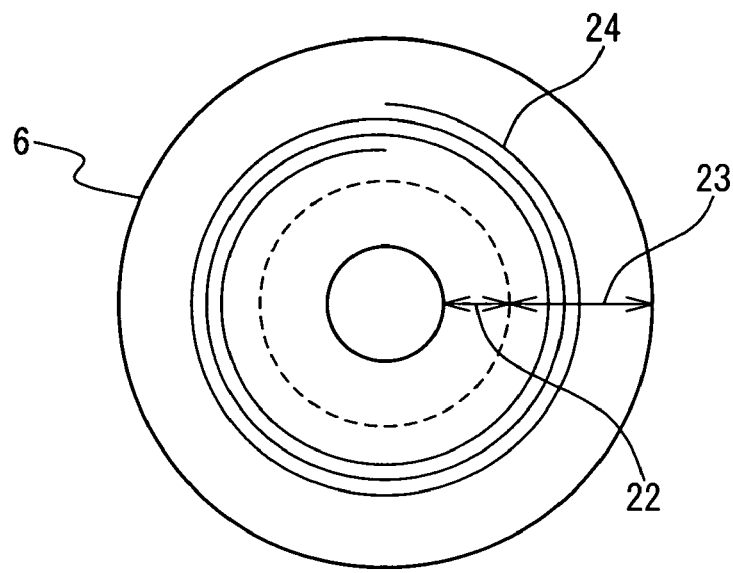
FIG. 3 is a diagram showing a configuration of an optical disc medium of the present invention.

FIG. 3 is a diagram showing the format of the recording type optical disc medium 6. Referring to FIG. 3, the recording type optical disc medium 6 has a system area 22, a data area 23 and a lead-out area (not shown) in a concentric manner from the inner circumference side.

The system area 22 is used to record a system data necessary for the recording and reproducing operations, including a disc data and a data indicative of a user data area in which a user data is recorded. An area in which a record control data is recorded to control the optical disc medium and an area used to check a record condition are secured in the system area 22.

The lead-out area indicates the end of the storage area on the optical disc medium 6. When the lead-out area is detected, it is recognized that the recording operation of the data is not ended on the optical disc medium 6, and cannot be carried out.

The data area 23 is located between the system area 22 and the lead-out area and is used to record the user data. A spiral recording track 24 is formed in the data area 23.

Figure 4:
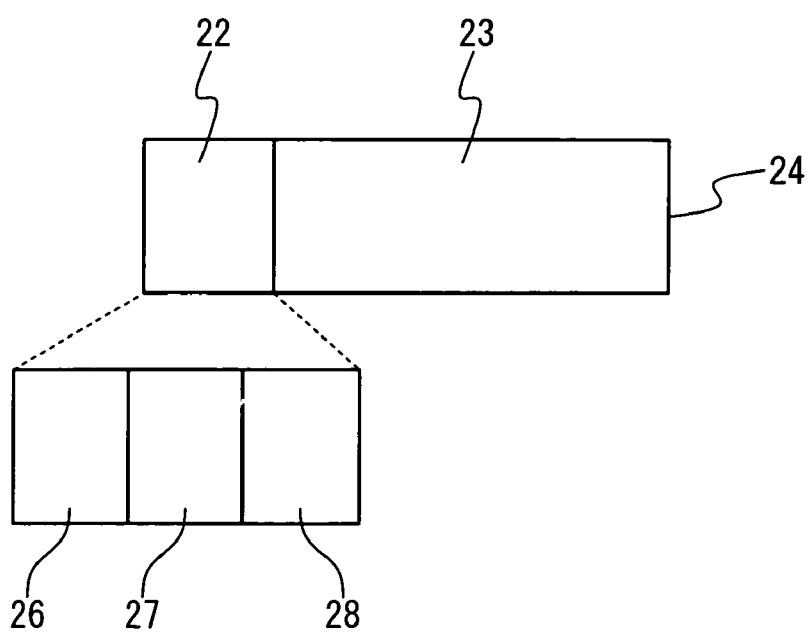
FIG. 4 is a block diagram showing a logical configuration of the optical disc medium of the present invention.

FIG. 4 shows the area arrangement on the disc 6 along the radius direction. Referring to FIG. 4, the area arrangement will be described below. In FIG. 4, the left side indicates the inner circumference side of the disc 6, and the right side indicates the outer circumference side thereof. The system area 22 on the inner circumference side includes a system control data necessary when the optical disc apparatus 4 carries out the recording and reproducing operations, and an arrangement data of recorded data on the optical disc medium 6. The system area 22 is roughly classified into three areas of a test record area 26, a record control data area 27 and a user data lead-in area 28.

The user data lead-in area 28 is arranged on the side closest to the data area 23. This area is used to record a system control data necessary when already recorded data is reproduced from the recording type optical disc medium 6 by the optical disc apparatus dedicated to reproduction. That is, an arrangement of the user data is recorded in the user data lead-in area 28.

The record control data area 27 is used to record a record control data about portions of the data area 23, i.e., a data necessary for the optical disc apparatus 4 to record user data in the data area 23. The record control data contains a data associating with a next recordable position in the data area 23, and the usage situation of the test record area 26. In accompaniment with the increase in the user data recorded in the data area 23, the data of the record control data area 27 is sequentially updated and increased. Thus, a new record control data is additionally recorded in a predetermined unit from the inner circumference side to the outer circumference side.

The test record area 26 is used for a trial recording operation to check the condition optimal to the recording operation. In order to optimize the recording condition in the data area 23, the trial recording is carried out while a power, a record waveform and the like are changed. Although the inside of the test record area 26 may be used in any order, typically, the outer circumference side is firstly used in many cases.

In such an optical disc medium 6, a border area is provided prior to the ending such that the apparatus dedicated to the reproduction can reproduce the recorded user data, namely, compatibility with the apparatus dedicated to the reproduction can be attained. An area segmented by the border areas is referred to as a bordered area.

Figure 5:
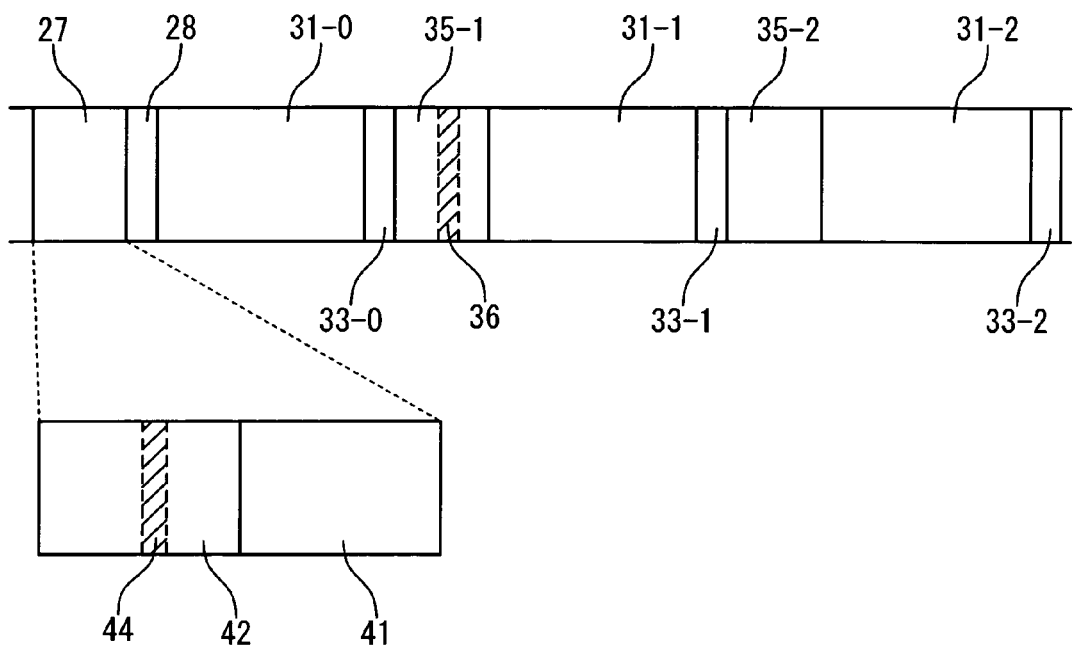
FIG. 5 is a diagram showing a configuration of a data region in the optical disc medium of the present invention.
Figure 6:
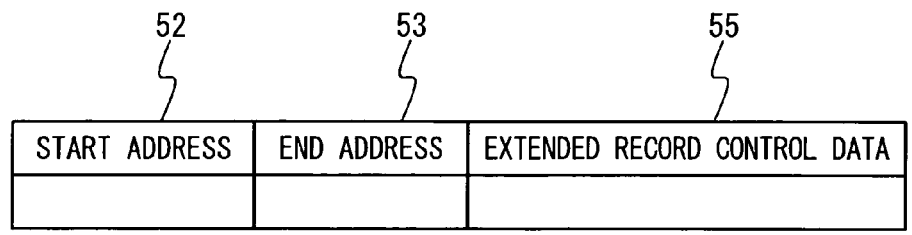
FIG. 6 is a diagram showing a configuration of a record control data of a extended record control data area in the optical disc medium of the present invention.

FIG. 5 shows an arrangement of various areas in the optical disc medium 6. Referring to FIG. 5, the arrangement of various areas will be described below. The record control data area 27, the user data lead-in area 28 and the test record area 26 (not shown) are provided in the system area 22. Bordered areas 31-0 to 31-2 segmented by the border areas 33-0 to 33-2 are arranged in the data area 23. An extended record control data area 35-1 is arranged between the border area 33-0 and the bordered area 31-1, and an extended record control data area 35-2 is arranged between the border area 33-1 and the bordered area 31-2. That is, the extended record control data areas 35-1 and 35-2 are arranged on the inner circumference sides of the bordered areas 31-1 and 31-2 other than the bordered area 31-0 on the innermost circumference side. An extended record control data necessary when the user data is recorded in the bordered area 31-1 is recorded in the extended record control data area 35-1. That is, the extended record control data contains a data about the user data and the like. The extended record control data for the bordered area 31-2 is recorded in the extended record control data area 35-2. As shown in FIG. 6, the extended record control data is recorded in the record control data area 27 of the system area 22, together with a start address 52 and end address 53 of the extended record control data areas 35-1. Here, in order to simplify the description, the description is made as the bordered areas 31-1 and 31-2 and the extended record control data areas 35-1 are 35-2 are separated. However, a part of the bordered area 31-1 or 31-2 on the inner circumference side may be used as the extended record control data area 35-1 or 35-2.

The record control data area 27 arranged in the system area 22 includes a basic data area 41 and a bordered area extended indication data area 42. A record control data associating with the arrangement of the user data is recorded in the basic data area 41 when the user data are recorded. When the extended record control data area 35 is established, a record control data associating with the extended record control data area 35 is recorded in the extension indication data area 42, and includes a data indicating a position (address) of the extended record control data area 35. It is preferable that the record control data recorded in the extension indication data area 42 includes a start address 52, an end address 53, and the extended record control data 55, as shown in FIG. 6. In this way, the record control data recorded in the extension indication data area 42 may have a special configuration.

On the other hand, usually, if a data indicating an address of a new extended record control data area 35 is provided in the record control data area to be recorded in the basic data area 41 and the extended record control data area 35, a merit can be obtained that the setting for each special configuration becomes unnecessary. In this case, when the new extended record data control area 35 is established, a new record control data is recorded in the basic data area 41 or the latest border record data control area 35 which has been used until that time, and at the same time, the same record control data is recorded in the extension indication data area 42. If the position of each of the extended record control data areas 35-1 and 35-2 can be specified, the record control data when the user data is recorded in the bordered area 31-1 or 31-2 can be obtained by referring to the extended record control data areas 35-1 or 35-2. Thus, the recording operation into the extension indication data area 42 is enough to be carried out only when the new extended record control data area 35 is established.

Figure 7:
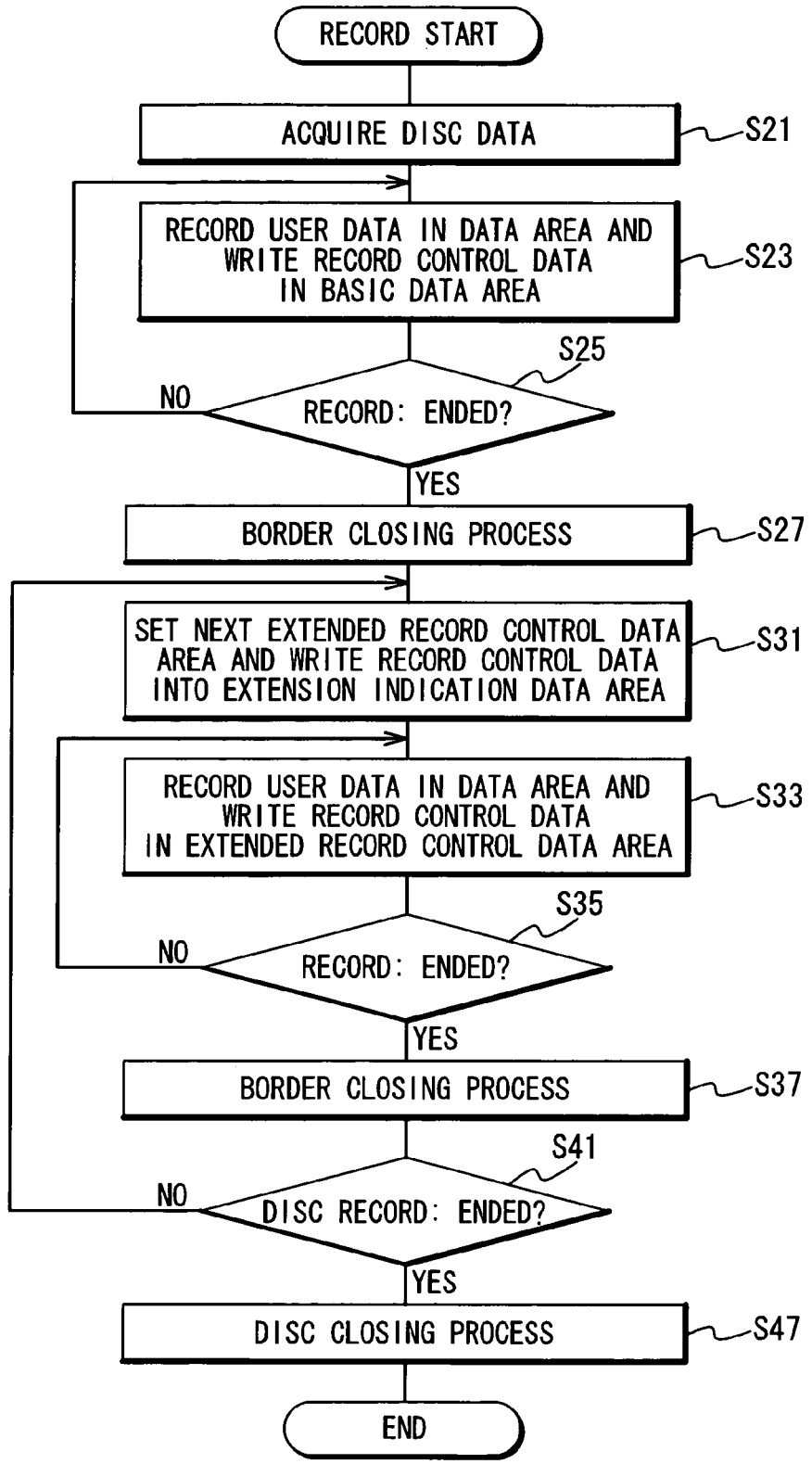
FIG. 7 is a flow chart showing a recording operation of the optical disc apparatus of the present invention.

The recording operation under the foregoing format will be described below with reference to FIG. 7. When the optical disc medium 6 is mounted on the optical disc apparatus 4, the CPU 10 controls the disc controller 14 which controls the rotation drive system 20 to rotate the optical disc medium 6. Also, the CPU 10 controls the disc controller 14 to read out the latest system data from the record control data area 27. The read out data is decoded by the decoder 18 and then outputted to the CPU 10. If the user data is already recorded partially, the optical disc apparatus 4 is controlled by the host apparatus 2 to carry out an additional recording operation after the last recorded position (Step S21).

It is supposed that the user data is recorded from the inner circumference side to the outer circumference side. In this case, when the user data should be recorded in the bordered area 31-0 on the innermost circumference, the user data is supplied from the CPU 10 to the encoder 16 where the user data is encoded. The encoded user data is recorded in the bordered area 31-0 on the innermost circumference by the access unit 12 through the disc controller 14. Also, the record control data about the user data is recorded in the basic data area 41 (Step S23). This recording operation is continued until the recording operation of the user data for one block has been ended (Step S25-NO), and the user data is recorded in the bordered area 31-0. If the recording operation of the user data for one block has been ended (Step S25-YES), a border closing process is carried out in accordance with a command from the CPU 10 (Step S27). In the border closing process, a border lead-out data is recorded in a border area 33-0, following the bordered area 31-0 where the user data has been recorded. Thus, the border area 33-0 is established. Also, the step S27 is the border closing process for the bordered area 31-0 on the innermost circumference side. Therefore, a dummy data is recorded in a non-recorded portion in the basic data area 41 of the record control data area 27 to secure the continuity of the recorded areas. Also, in the border closing process, an area for an extended record control data area 35-1 is reserved. The size of the extended record control data area 35-1 may be instructed by the host apparatus 2 or may be set in the optical disc apparatus 4 in advance.

When a next user data should be recorded, a border lead-in data is recorded in the user data lead-in area 28, and then the extended record control data area 35-1 for a next bordered area 31-1 is established. When the extended record control data area 35-1 is established, a record control data 44 of the start address 52 and the end address 53 of the extended record control data area 35-1 is recorded or copied in the extension indication data area 42 of the record control data area 27. Thus, it is indicated that the extended record control data area 35-1 is established (Step S31).

After the extended record control data area 35-1 is established, the user data is recorded in the bordered area 31-1. Also, a record control data 36 of the user data is recorded in the extended record control data area 35-1 (Step S33). Until the recording operation of the user data has been ended, the recording operation is continued (Step S35-NO). If the recording operation of the user data has been ended (Step S35-YES), the border closing process of the bordered area 31-1 is carried out. In the closing process for the bordered area 31-1, the border lead-out data is recorded in the border area 33-1, following the bordered area 31-1. Also, the record control data for the user data recorded in the bordered area 31-1 is recorded in the extended record control data area 35-1, and also is recorded in the record control data area 42 of the extension indication data area 42. Therefore, a dummy data is recorded in a non-record portion remaining in the extended record control data area 35-1 to secure the continuity of the recorded areas. Also, a border lead-out data is recorded in a border area 33-1, following the bordered area 31-1 where the user data has been recorded. Thus, the border area 33-0 is established. In addition, in the border closing process, an area for an extended record control data area 35-2 is reserved (Step S37).

When an additional recording operation is further carried out (Step S41) after the bordered area 31-1 is closed, the user data is recorded in a next bordered area 31-2. When all of the user data is recorded on the optical disc medium 6 and the additional recording operation is unnecessary (Step S41-YES), the disc closing process is carried out. The disc closing process is instructed by the host apparatus 2. In the disc closing process, the user data lead-out data is recorded, following the last border area to indicate the end of the recording of the optical disc medium 6. Also, the dummy data is recorded in a non-record area of the extension indication data area 42 of the record control data area 27 to secure the continuity of the recorded areas.

In this way, the extended record control data area 35 is provided in a portion of the bordered area on the inner circumference side, and the fact that the extended record control data area 35 is provided is recorded in the extension indication data area 42. The record control data when the user data is recorded is recorded in the extended record control data area 35. For the reproduction of the recorded user data, the extension indication data area 42 is referred to know the positions of the extended record control data areas and then the access is carried out. The user data in the bordered area and the record control data can be obtained by accessing all of the record control data areas 35. Thus, the access time can be made short, as compared with a case where the data is dispersed in various portions of the optical disc medium 6. Also, the data to be recorded in the record control data area 27 secured in the system area 22 is dispersed to the extended record control data areas 35. Thus, the extended record control data area 35 is secured only for a size necessary for the data area 23. Thus, an area to be reserved in advance in the system area 22 can be reduced, and therefore, the data area 23 can be extended. Also, since data of the entire extended record control data areas 35 are managed in the extension indication data area 42. Therefore, it is easy to collectively manage the data of the respective bordered areas 31.

In the above description, the extended record control data area 35 for the next user data is reserved in the border closing process for the current user data. However, when the next user data is recorded, the extended record control data area 35 for the next user data may be reserved and established.

According to the present invention, an optical disc medium in which a recordable area recognized by the user can be increased. Also, it is possible to increase the number of times of the recording operation. Moreover, the access time can be made shorter, when the user data recorded on the optical disc medium is reproduced.

What is claimed is:

1. An optical disc medium comprising:

a system area; and a data area following said system area, wherein a plurality of sets of an extended record control data area, a bordered area, and a border are possibly established in said data area continuously from said system area, wherein a first set of said plurality of sets does not include said extended record control data area, wherein a user data is recorded in each of said bordered areas, wherein in each of said plurality of sets other than said first set, a record control data, associated with said user data which is recorded in said bordered area of the set, is recorded in said extended record control data area, wherein a record control data associated with said user data recorded in said boarded area of said first set is recorded in said system area, wherein a control data associated with said extended record control data area of each of said plurality of sets, other than said first set, is recorded in said system area, wherein in each of said plurality of sets other than said first set, said extended record control data area, said bordered area, and said border area are established in this order, wherein said control data comprises a start address and end address of said extended record control data area, and wherein said control data further comprises said record control data which is recorded in said extended record control data area of each of said plurality sets other than said first set.

* * * * *